May 10, 1927.

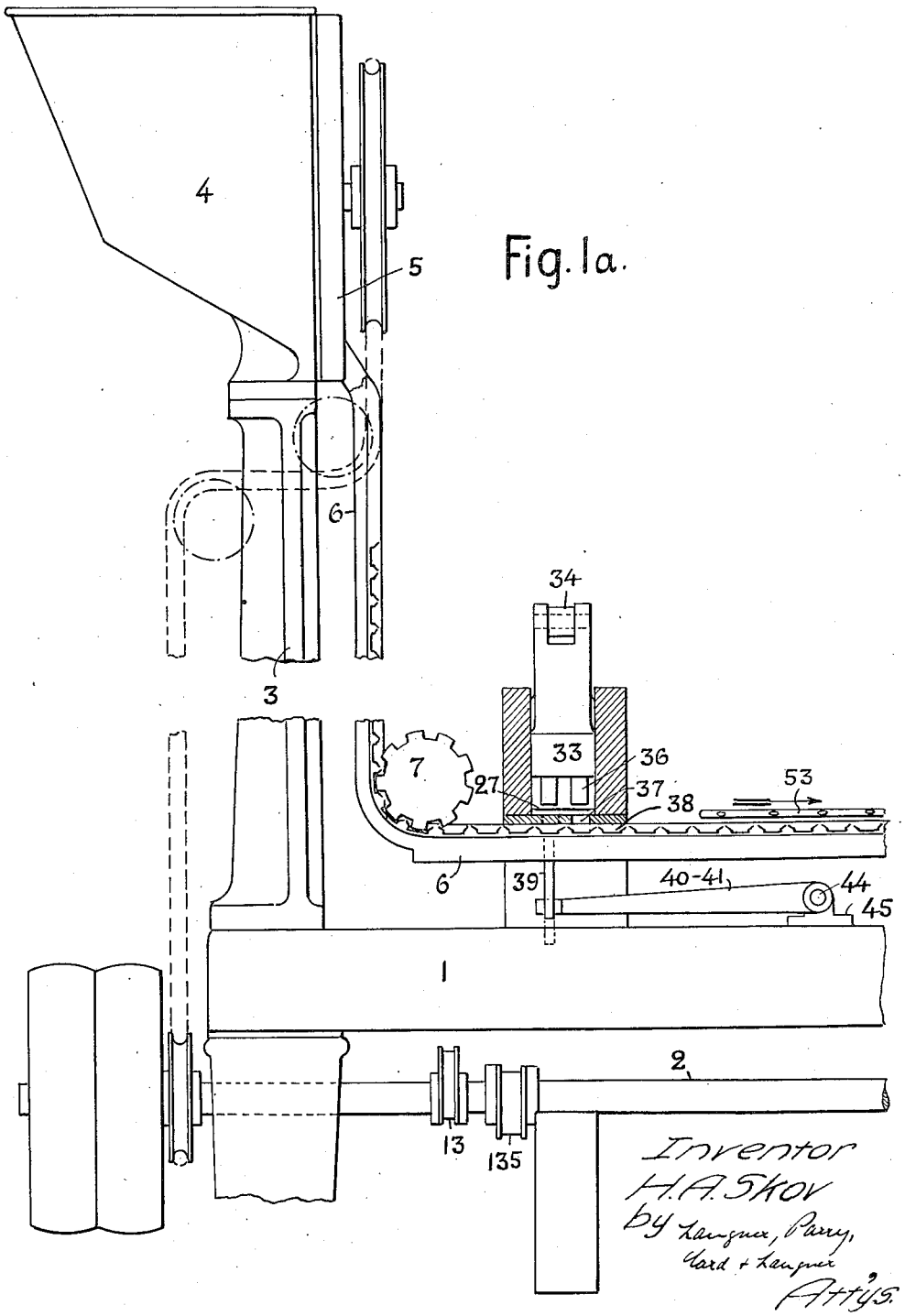

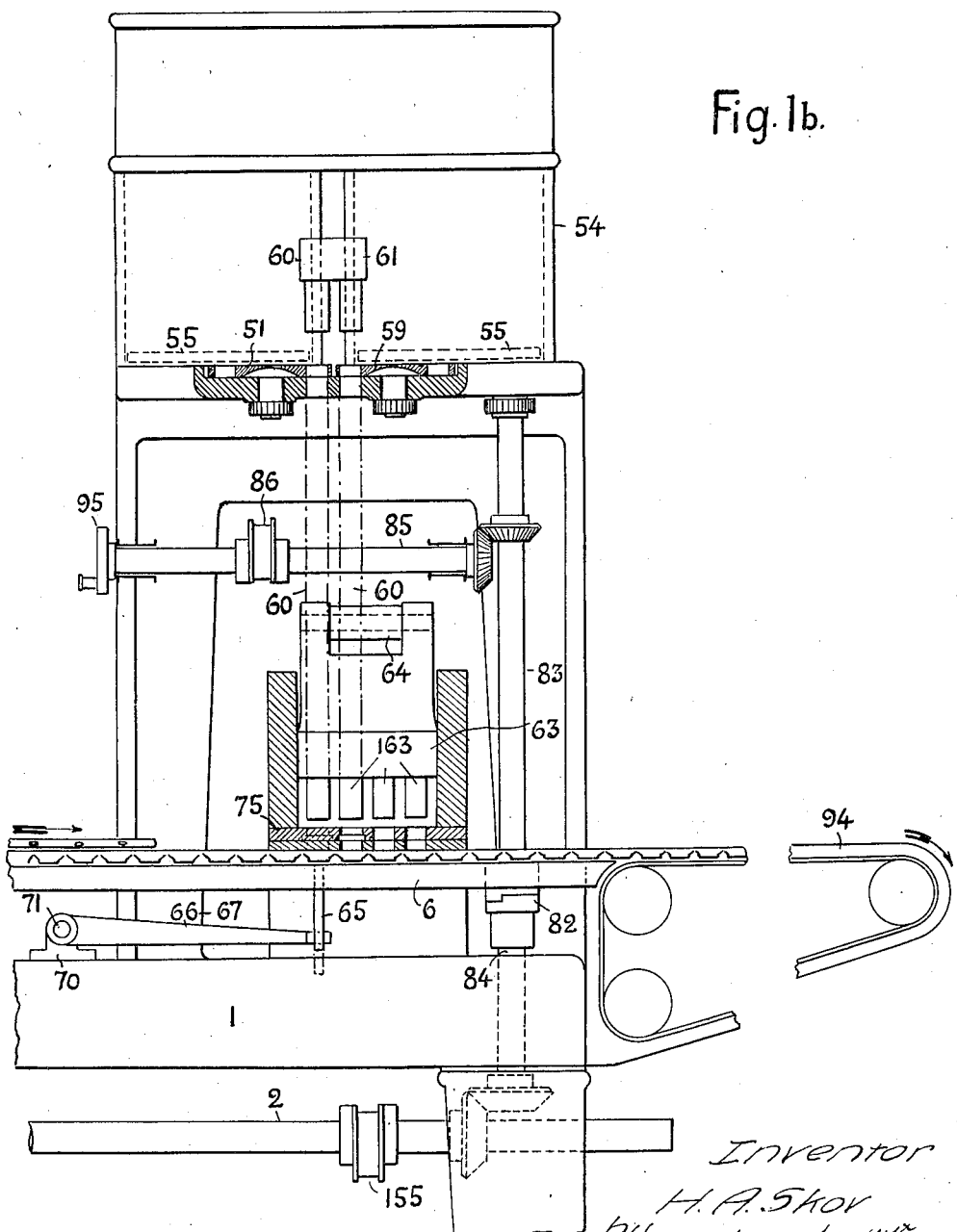

H. A. SKOV 1,628,338

MACHINE FOR MANUFACTURING BOTTLE CAPS

Filed Nov. 5, 1925

Inventor
H. A. Skov
by Langner, Parry, Card & Langner
Attys.

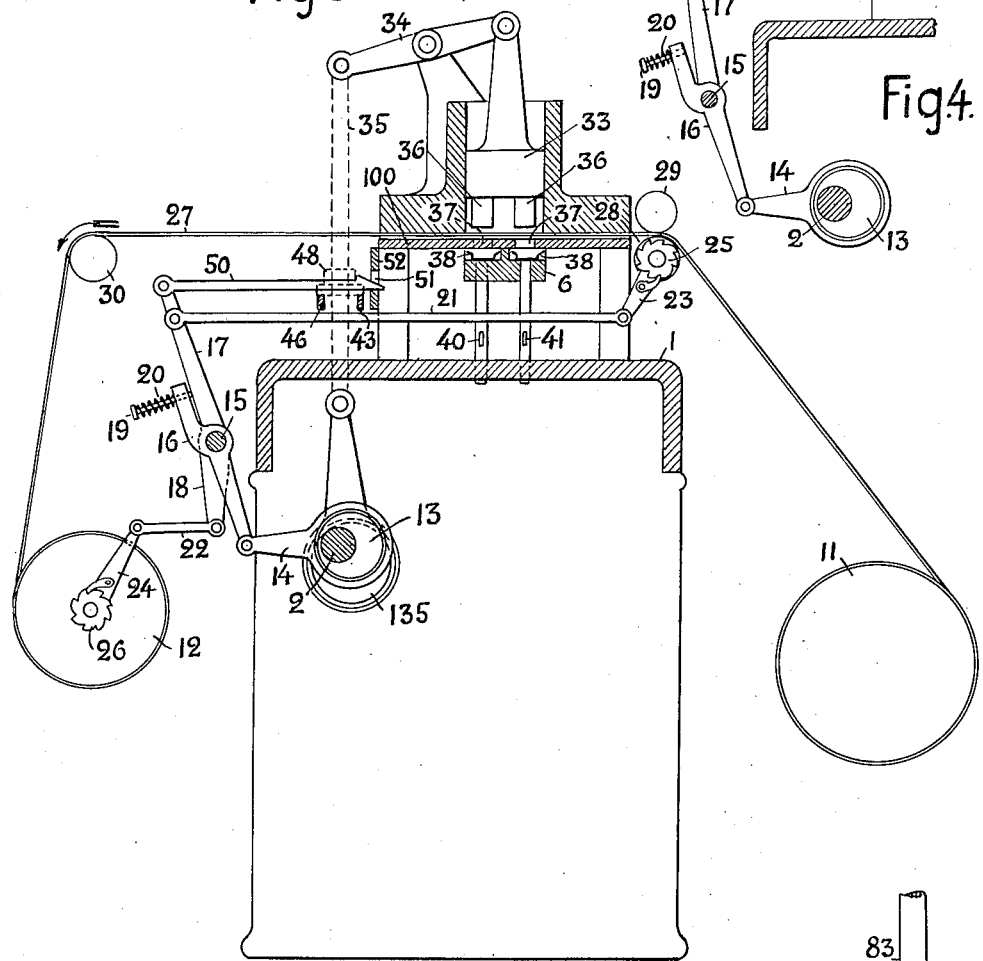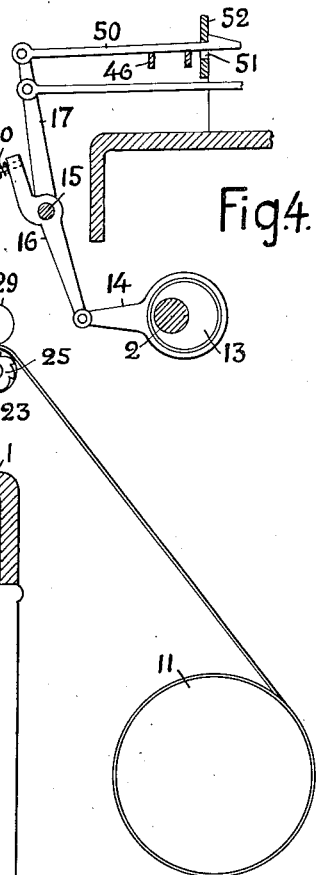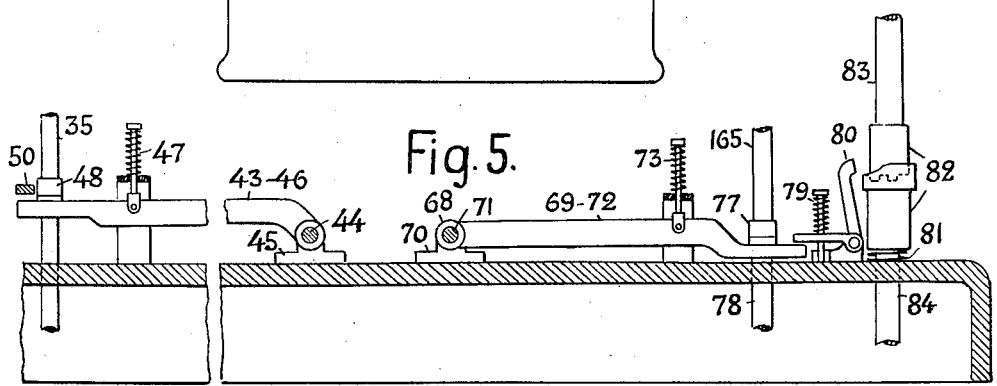

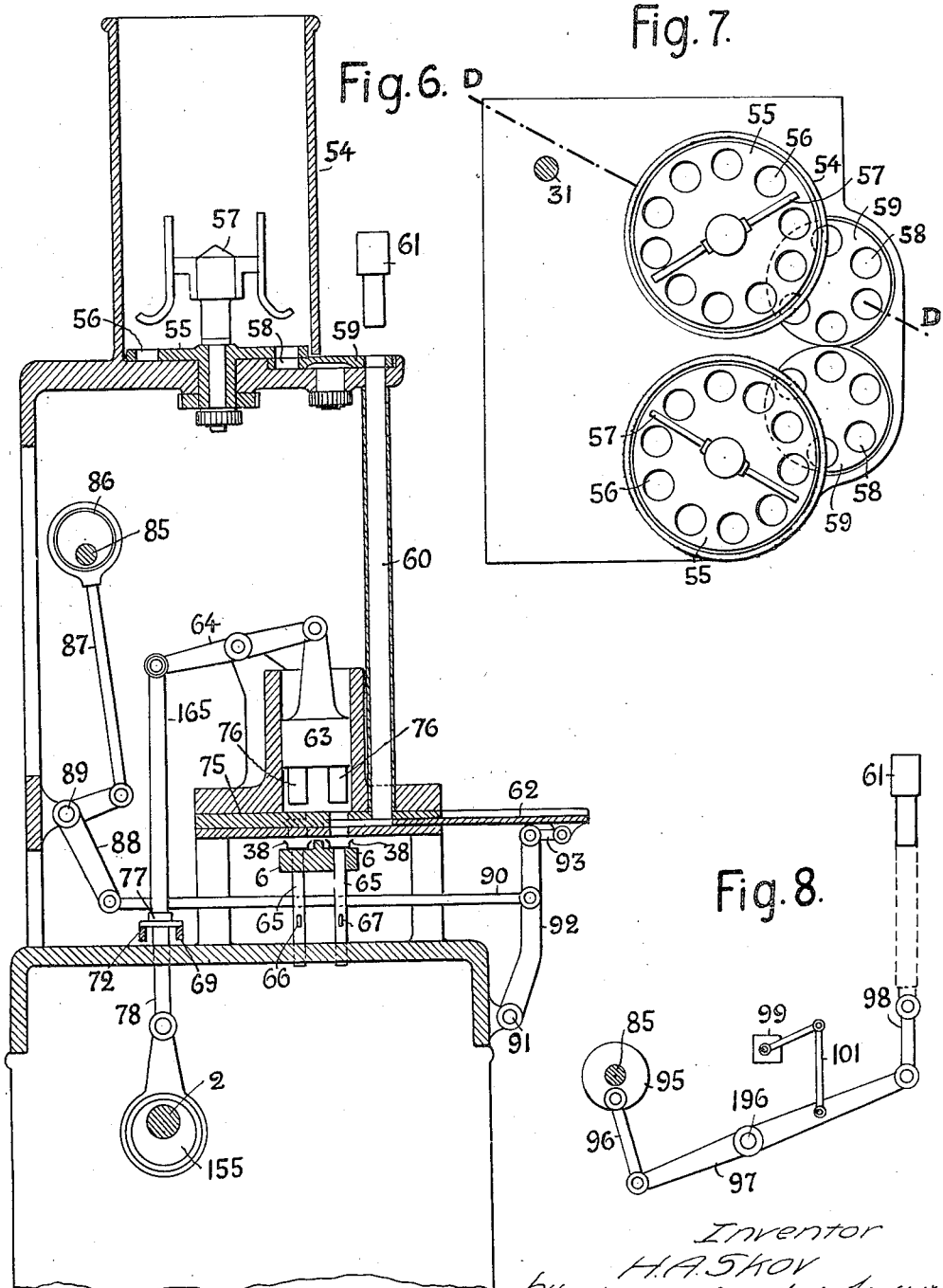

May 10, 1927.

H. A. SKOV 1,628,338

MACHINE FOR MANUFACTURING BOTTLE CAPS

Filed Nov. 5, 1925 7 Sheets-Sheet 6

Inventor
H. A. Skov
by
Langner, Parry, Card & Langner
Attys.

May 10, 1927. 1,628,338
H. A. SKOV
MACHINE FOR MANUFACTURING BOTTLE CAPS
Filed Nov. 5, 1925 7 Sheets-Sheet 7
Fig. II.
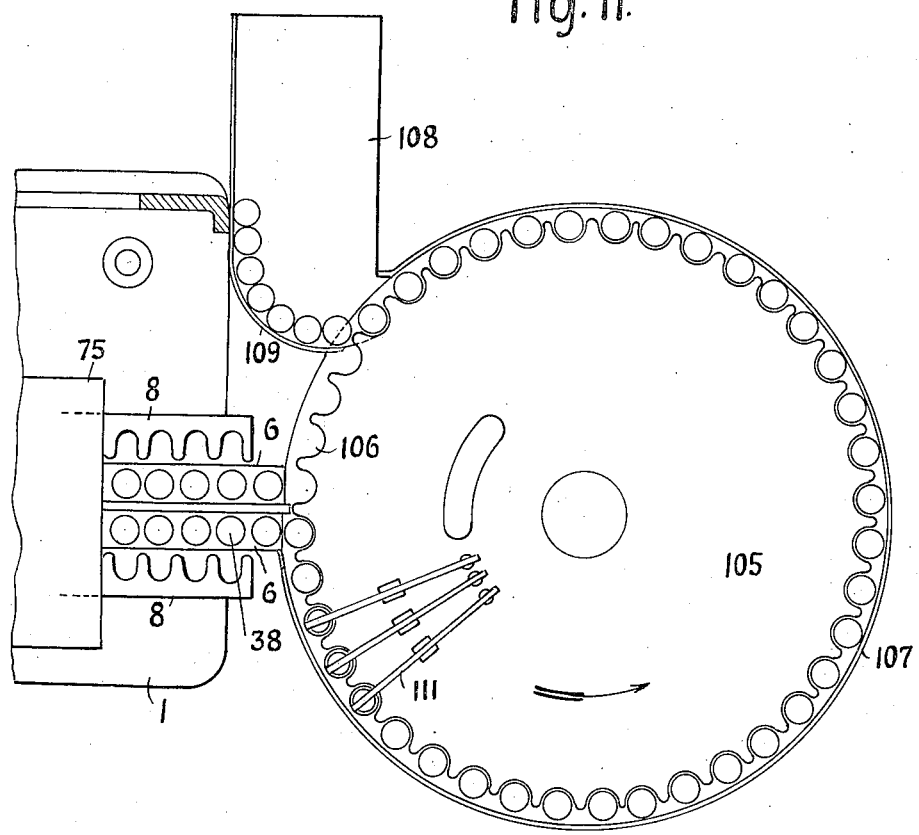
Inventor
H. A. Skov
by Langner, Parry, Card & Langner
Att'ys.

Patented May 10, 1927.

1,628,338

UNITED STATES PATENT OFFICE.

HENRY ARNOLD SKOV, OF COPENHAGEN, DENMARK, ASSIGNOR TO DANSK PRESSE-FABRIK A/S, OF COPENHAGEN, DENMARK.

MACHINE FOR MANUFACTURING BOTTLE CAPS.

Application filed November 5, 1925. Serial No. 67,093.

The present invention relates to a machine for manufacturing bottle caps, the machine essentially being designed to provide the caps, which have been pressed in form and are fed into the machine, with both a paper lining, or in place of the same with a layer of adhesive matter, and with cork discs.

The essential feature which distinguishes the machine according to the present invention from machines previously known for manufacturing bottle caps consists in the fact that the present machine is designed in such a manner that it will continuously deal with two or several rows of caps, which are guided in ways longitudinally disposed in the machine and gradually advanced beneath the necessary tools which serve to provide the caps first with a paper lining or an adhesive material, and thereafter with a cork lining.

A further advantage of the machine according to the present invention lies in the fact that the machine is thus designed that the tools which apply the paper or the adhesive, and the cork, respectively, to the caps will not perform their operation if, for some reason or other, a cap is missing in the feed row beneath the tool. As a counting device is provided in combination with the attachment on the machine, by which the cork discs are placed into the caps, it is secured, that the counter will accurately show how many caps the machine has completed.

In the accompanying drawing two constructional forms of a machine for manufacturing bottle caps is shown, partly in diagram, Figs. 1 to 8 showing the main parts of the machine corresponding to the one constructional form, while the Figs. 9–11 show the parts of the machine belonging to the other constructional form. In the constructional forms shown the machine is seen to be constructed in such a manner that it has two feed rows or ways for the bottle caps.

Fig. 1, a and b, is a vertical section through the machine on the line A—A in Fig. 2.

Fig. 3 is a section on the line B—B in Fig. 2.

Fig. 4 shows some of the attachments in Fig. 3 in a different position.

Fig. 5 is a part of the releasing mechanism by which the operating parts of the machine are disengaged when one or several caps are missing in the feed rows.

Fig. 6 is a diagram showing a section on the line C—C in Fig. 2, and, with regard to its upper part, a section on the line D—D in Fig. 7.

Fig. 7 is a diagram showing the cap feed attachment seen from above.

Fig. 8 is likewise a diagram showing how the counting device is operated from one of the levers which move when the cork fitting attachment operates, so that the counting device will only record the number of the actually completed caps.

Figure 9:
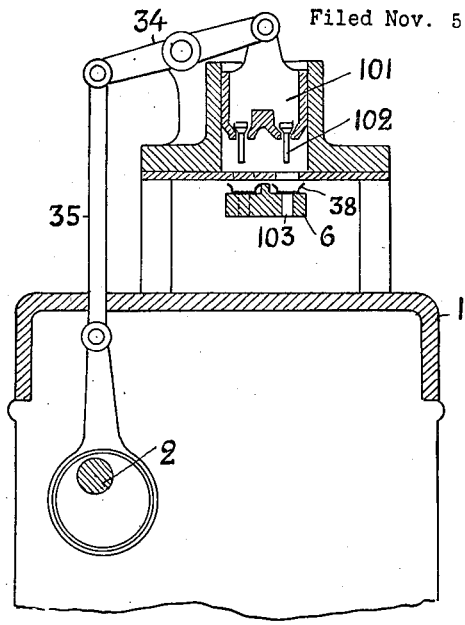
Figure 10:
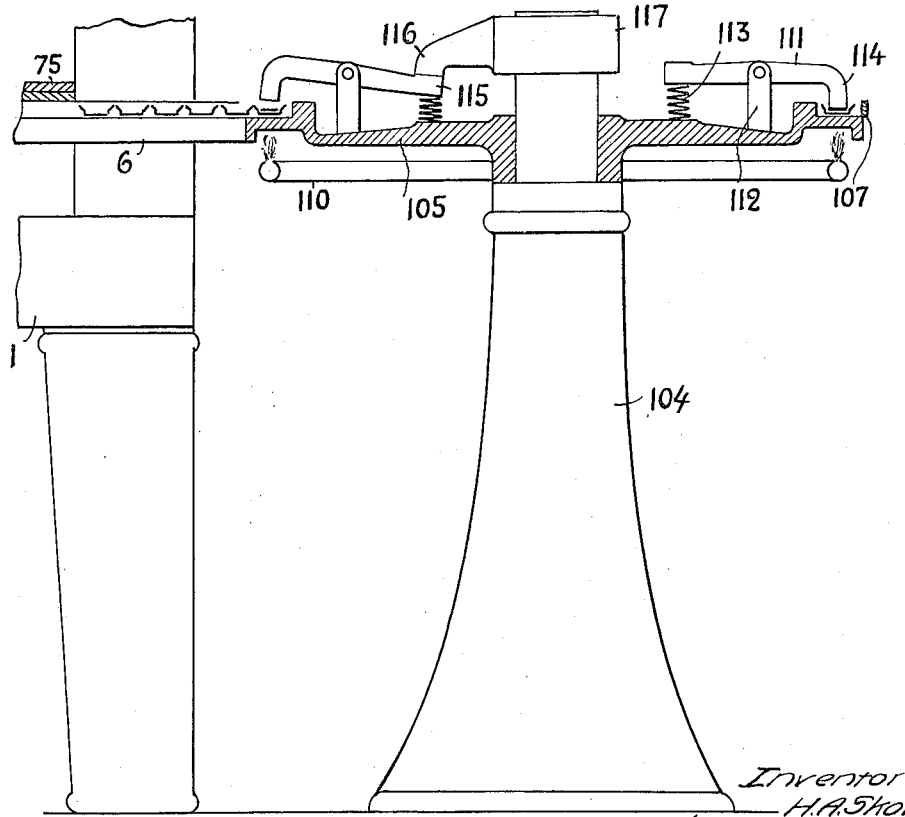

Figs. 9–11 correspond essentially to the other constructional form of the machine, Fig. 9 being an arrangement by which the caps can be provided with a coat of adhesive material in place of with a paper lining, and Figs. 10 and 11 showing the heating table seen from the side and from above, respectively, which forms the last element of the machine operating with adhesive material.

Figure 2A:
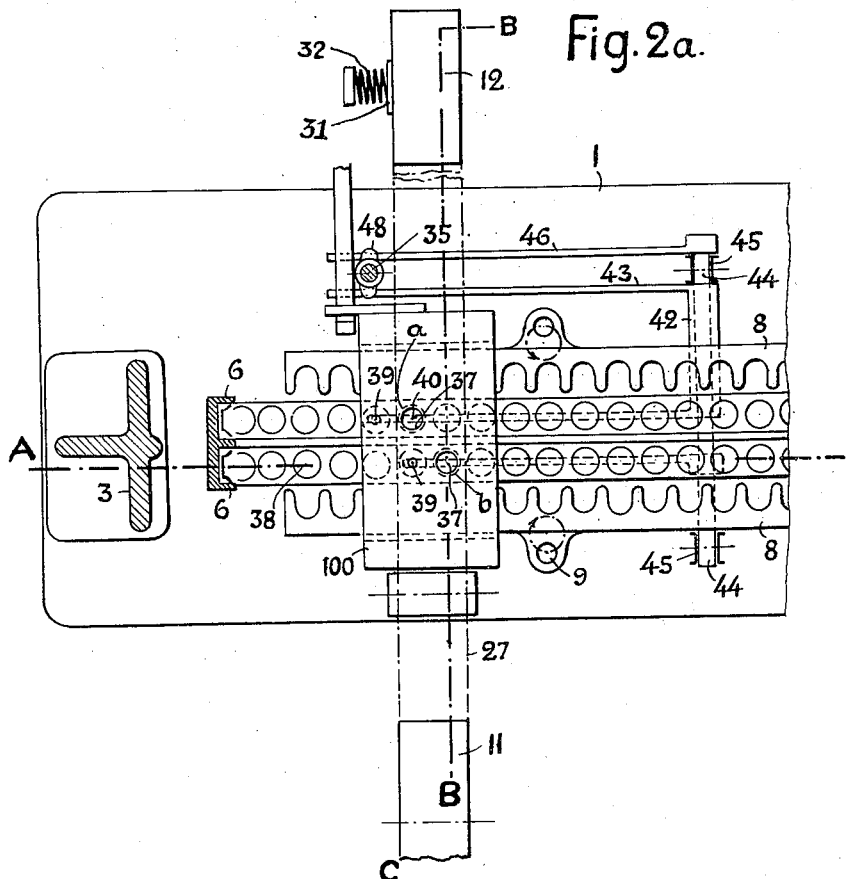
Fig. 2 is the machine seen from above.
Figure 2B:
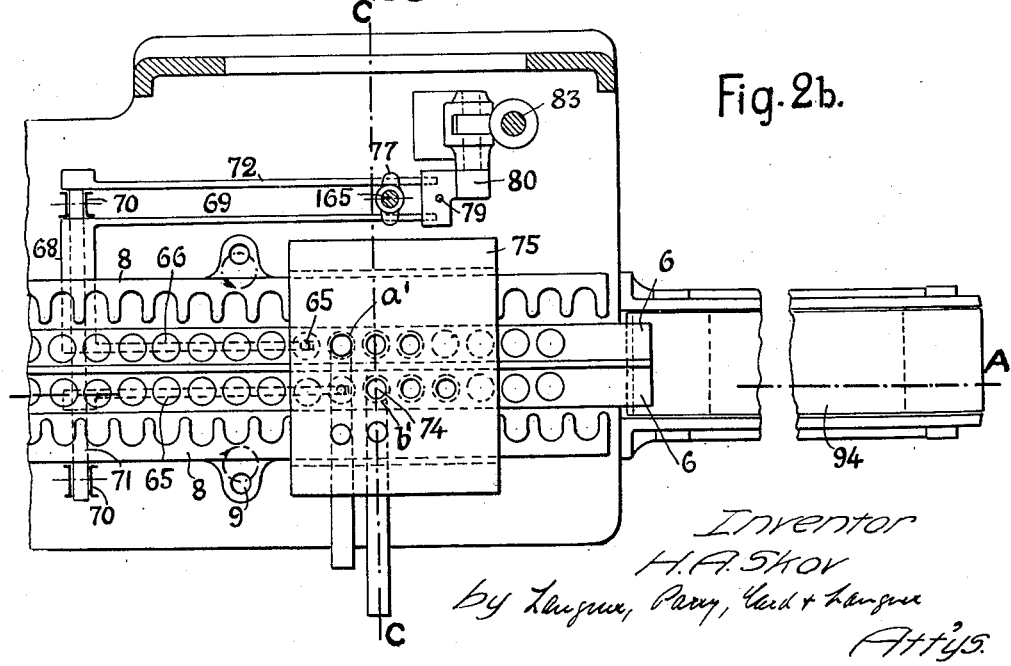

In Fig. 1 the numeral 1 is the tablelike part of the machine which is supported by a suitable stand or legs. The main shaft 2 of the machine is disposed, as will appear from Fig. 1, beneath the table 1, and carries on its left end the necessary pulleys. At the end of the table 1 which, in Figs. 1 and 2, is seen on the left, a standard 3 is fitted, which, at its top carries a cap sorting device 4 consisting of a container, with the empty caps, the one side of this container being essentially formed by a revolving sorting wheel 5 which, in known manner, will sort the caps so that these slide down into the two cap feeding races 6 in such a manner that all caps in these two races will turn their open sides away from the down races 6. The cap feed races 6 consist not alone of the aforementioned vertical part, but are continued as shown in Figs. 1, 2, 3 and 6 over the table 1 of the machine so that the caps are actually guided in the said races during the whole of their passage through the machine. For advancing the caps in the horizontal part of the races 6 a pair of feed wheels 7, Fig. 1, are provided, formed to resemble sprocket wheels and corresponding in form to the shape of the caps, these feed wheels 7 being driven from the main shaft of the machine. Furthermore the caps are guided and advanced in the horizontal part of the races 6 by means of racklike bars 8 the movement of which is determined by two points of each bar 8 being secured to crank pins 9 (Fig. 2) driven from the main shaft. At the other end of the machine which is seen on the right in Figs. 1 and 2, there is a belt conveyor 94 which will convey the caps further after they leave the racks 8.

Transversely to the table 1 and therefore also transversely to the horizontal part of the cap feed races and the just mentioned feed devices 8 for the caps, are disposed the devices by means of which the caps are fitted with an impregnated paper disc and, later on, have a cork disc pressed into them. As it will appear from Fig. 2 the whole device which serves to fit the paper disc is arranged transversely across the machine along the line B—B, while the whole device which serves to fit the cork discs is disposed transversely across the machine on the line C—C.

Both the paper disc fitting device and the cork disc fitting device deal simultaneously with caps in each of the feed races 6. The simultaneously treated caps are preferably not caps lying side by side, but preferably caps lying the one ahead of the other for example, as shown in the drawing, in Fig. 1 two caps $a$, $b$ by one interval ahead of the others $a'$, $b'$. The device for fitting the paper disc is shown in Fig. 3, in which 11 is the roll of impregnated paper from which the discs are stamped out while 12 is the roll on which the paper is rolled up after the discs have been stamped out (the waste paper roll). The two rolls 11 and 12 are revolved intermittently from the main shaft by means of the following arrangement: To the shaft 2 is fixed an eccentric 13, which operates an eccentric rod 14, pivoted at its one end to a double-armed lever 16 fitted loose to a shaft 15. To the said shaft 15 are also fitted two levers 17 and 18 of which the lever 17 is coupled to the lever 16 by means of a pin 19 passing through a slot in the same. Between the head of said pin 19 and the lever is disposed a spring 20 which, normally, will hold the lever in contact with the lever 16, so that it is reciprocated with the lever 16 and thereby also reciprocate the other lever 18 fitted to shaft 15. To the levers 17 and 18 are pivoted reciprocatable bars 21 and 22, which, at their opposite ends are pivoted to levers 23 and 24, respectively, which carry pawls which, by means of springs are forced against ratchet wheels 25 and 26, respectively, of which the ratchet wheel 25 is fitted to the shaft of a feed roller 28 serving to feed the paper tape 27, whereas the other ratchet wheel 26 is secured to the shaft of the waste paper roll 12, so that these two shafts will be turned one step each time the levers 17 and 18 are moved forward by the lever 16. When the lever 16 is again returned, the spring 20 will cause the levers 17 and 18 to be likewise returned, whereby they will carry with them the levers 21 and 22 with their pawls so that these are brought into position for the next advancing step. The feed roller 28 of the paper tape driven by the pawl co-operates with a loose feed roller 29 and the paper tape is guided over a leather roller 30 to the waste paper roll 12. For keeping the tension in the paper tape even, when the diameter of the roll 12 increases in consequence of the paper being rolled up on it, the roll is fitted loose on its shaft by which it is dogged by means of a friction member 31 (Fig. 2) fitted axially displaceable to the said shaft and revolving with it, which, by means of a spring 32 is forced inwards against the roll 12. The tension of the spring is so adjusted that the pull in the paper tape cannot exceed a given, admissible degree.

The intermittent feed of the paper tape across the table 1 is synchronous with that of the caps effected by the bars 8 and with the vertically reciprocating operation of the plunger 33, which, for stamping out the paper discs is disposed over the table 1 and is suspended from the one end of the double-armed lever 34 which is rocked by a rod 35 coupled to its other end and operated by the eccentric 135 fitted to the main shaft 2. The plunger 35 has, in the constructional form here shown two stamps 37 which, on the plunger descending enter into holes 37 in a plate 100 arranged over the table 1, between which plate 100 and the stamp the paper tape 27 is passed so that paper discs are therefrom stamped out which are by the stamps 36 pressed down into the caps 38 for the moment lying in the races 6 beneath the holes 37 (Fig. 3).

In order to prevent that the hereinbefore described devices for fitting the paper discs into the caps perform their operations if, for some reason or other, the caps are missing in the rows of caps advanced in the races 6, vertically movable bars 39 are provided beneath the holes 37 in the plate 38, in the lower end of which bars 39 slots are provided for each a double-armed lever, 40 and 41, respectively (Fig. 2) of which the arm 40 is fitted to the one end of a hollow shaft 42, which at its other end carries a lever 43, while the arm 41 is fitted to a shaft 44 passing through the hollow shaft 42, the shaft 44 being journalled in bearings 45, and carrying a lever 46. A spring 47 (Fig. 5) tends to turn the levers 43 and 46 upwards, which however, will normally be prevented by the upper ends of the bars 39 bearing against the bottom of the caps.

If, however, one or several of the caps should be missing in the one or the other of the races 6, and when the respective point arrives over the bar 39, the upward pull of spring 47 in the lever 43 or 46 corresponding to the respective bar will have the effect that the lever will be turned upwards and thereby lift the nose 50 pivoted to lever 17 so that this nose, which otherwise can freely reciprocate in a hole 51 (Fig. 3) in a plate 52 will be caught by the plate and thereby prevent the lever 17, and with it also lever 18 from performing the movement necessary for returning the pawl so that the feed of the paper tape is also discontinued.

It is therefore obvious that when there is a cap missing in one or in both rows, no paper discs will be stamped out, as the stamps 36 will be working in the old holes and the paper tape will be stationary so that neither the cap lying in the one race beyond the empty space will be fitted with a paper disc but is simply advanced to be sorted out subsequently when it has left the machine.

When the plunger 33 after having worked in the previously stamped out holes in the paper tape is again moved upwards, a shoulder 48 (Figs. 2, 3 and 5) provided on its operating bar 35 will meet the levers 43 and 46 and force them downwards, whereby also the levers 40 and 41 connected to them are moved downwards, the bars 39 and the nose 50 is disengaged and the spring 20 returns the levers 17 and 18 into normal position, so that the paper disc fitting device will again operate in the normal manner.

During their travel from the paper disc fitting device to the cork disc fitting device the caps pass beneath a gas burner 53 (Fig. 1) which will heat the caps so that the impregnating material melts.

The cork disc fitting device is shown in Figs. 1, 6 and 7 and consists of two containers 54 into which the cork discs are filled and in the bottom of which is fitted a disc 55 continuously rotated by the main shaft 2 of the machine. Along the circumference of this disc 55 there are holes 56 the diameter of which corresponds to that of the cork disc, and into which the cork discs are moved by an agitator 57 revolving in the container so that the said discs will from these holes 56 fall down into holes 58 along the circumference of another disc 59 likewise rotated from the main shaft 2, the latter disc 59 conveying the cork discs out from the container to a down race 60 leading to each of the races 6, in which the cork discs fed by the disc 59 will be stamped down by means of a vertically reciprocating stamp 61 operated likewise from the main shaft 2 by means of a hereinafter described shaft 85. The cork discs sliding down in the down races 60 are moved by a horizontally reciprocating cork slide beneath the vertically reciprocated cork stamp 63 which serves to press the cork discs down into the caps and may be fitted with one or several plungers 163. This stamp 63 is suspended at its one end from a double-armed lever 64 the other end of which is coupled to a bar 165 which is vertically reciprocated synchronously with the cap feed mechanism.

If a cap is missing in one or both of the rows of caps fed by the bars 8 through the races 6, the cork disc fitting device will temporarily be set out of action when the empty space arrives beneath it. This is effected by means of a mechanism corresponding to the disengaging mechanism of the paper disc fitting device.

This mechanism consists of vertically reciprocable bars 63 passing through holes in the races 6 (Fig. 6) having each slots for its lever 66 and 67, respectively, of which the lever 66 is fitted on a hollow shaft 68 (Figs. 2 and 5) which likewise carries a lever 69, while the lever 67 is fitted to a shaft 71 passing through the hollow shaft 68 and journalled in bearings 70, said shaft 71 carrying another lever 72 situated beside lever 69, these two levers 69 and 72 being drawn upwards by means of springs 73. This is, however, normally prevented by the caps advanced over the bars 65. The bars 65 are disposed somewhat ahead of the holes 74, Fig. 6, in the plate 75 arranged above the races 6, through which holes the cork stamp depressing pin 76 acts. If now a cap is missing in the row, the bar 65 will, on the empty space arriving over it, lose its supporting point so that the spring 73 can turn the respective arm 69 or 72 upwards. Thereby an angleshaped disengaging member 80 is operated, which is normally held by a spring 79 (Fig. 5) in an inoperative position, so that it disengages a clutch 82 which normally is held in engagement by a spring 81, this clutch coupling the shaft 83 driving the cork slide 62 with a shaft 84 driven from the main shaft 2, so that the operation of the cork disc feed device (cork slide) and of the stamp 61 is stopped, as all these parts are driven from the disconnected shaft 83 or 85, respectively (Fig. 1). The cork slide 62 is namely reciprocated by the said shaft 85 which carries an eccentric 86 (Figs. 1 and 6) which by means of an eccentric rod 87 is coupled to a double-armed lever 89 pivotally fitted on a fixed pin 89, the said double-armed lever being, by means of a connecting rod 90 coupled to a lever 92 pivoted on a fixed pin 91 which lever 92 by means of a link 93 is coupled to the cork slide 62 so that the latter is reciprocated synchronously with the intermittent feed of the caps when the shaft 85 is revolved.

It is obvious that the cork disc fitting device is stopped when a cap is missing in one of the rows fed, so that there will neither be fitted a cork disc into the cap lying in the other race opposite to the empty space. This cap which is the same into which there has neither been fitted a paper disc will thus be advanced undealt with out of the machine and will be sorted out. When the cork fitting stamp is again moved upwards under action of the eccentric 155 on the main shaft, a shoulder 77 provided on its operating bar 165 (Figs. 2, 5 and 6) forces the levers 69 and 72 downwards whereby it will be caused that the spring 79 again can bring the disengaging member 80 into an inoperative position, whereupon the spring 81 immediately engages the clutch 82, so that the stamp 61 and the cork slide 62 and the cork disc fitting device will again come into operation, until there is again a cap missing in one of the races fed forward.

When the cork discs are pressed down into the caps, the melted impregnating material will there cause the paper discs and the cork discs to stick to the caps.

After the caps have left the cork disc fitting device they are intermittently advanced further and will eventually pass out onto a belt conveyor 94 where the not treated caps, or the defective caps are sorted out.

If the caps which shall be made, do not need to have a paper lining, it will, in such case, be sufficient to apply a layer of some kind of adhesive matter or other between the cork disc and the cap, and then the design of the machine shown in Figs. 1 to 8 may be simplified, by the paper disc fitting device shown in Figs. 1, 2, 3 and 4 being omitted, and in its stead the arrangement employed as shown in Fig. 9, by means of which a drop of some suitable adhesive material is applied to the bottom of the caps, which adhesive will subsequently when the cork disc is pressed down into the cap, be pressed flat into the insulating layer of adhesive matter between the cork disc and the bottom of the cap.

As it appears from Fig 9 the here described device for applying adhesive matter consists of a container 101, in the bottom of which there is the necessary number of outlets for the adhesive. These outlets, of which there are two in the present instance, are normally closed by a pair of valves 102. The container 101 is suspended from a double-armed lever 34 and is thereby vertically reciprocated together with the bar 35, the whole device being arranged at that part of the machine where otherwise the paper disc fitting device would be. When the lever 34 performs its hereinbefore described rocking movement synchronously with the intermittent advance of the caps, the container 101 will be raised and lowered so that the lower end of the spindles of the valves 102 will abut against the bottom of the respective cap 38 which is immediately beneath the valve spindle. Thereby the valve will be lifted so that a small quantity of the adhesive will run out onto the bottom of the respective cap. Thereafter the cap will pass on beneath the gas burner 53 and in beneath the cork disc fitting device where the adhesive will, on the cork disc being pressed down, be spread out into a thin insulating layer between the cork disc and the bottom of the cap.

In case that, for some reason or other, there should not be any cap in the row beneath the valve 102, the valve spindle will not be stopped during its downward stroke, but will be able to move freely down in a hole 103 provided in the cap feed race 6 immediately under the valve. The valve will, thus, remain closed so that it will not be opened to let out the adhesive.

As it will appear from that hereinbefore stated, it is the hole 103 in co-operation with the valve 102 which puts the adhesive matter applying device out of operation and in consequence thereof it is not necessary that the machine, when it is to work with adhesive matter, is fitted with the disengaging levers 40 and 41 (43 and 46) and the devices belonging thereto.

With the constructional form of the machine which produces bottle caps with adhesive matter in place of the paper lining, it will often be necessary to employ in place of the belt conveyor 94 the pressing device for the cork discs shown in Figs. 10 and 11, as these cork discs should, while they are being heated, be pressed tightly against the bottom of the cap. This device consists of a table 105 revolving on a standard 104, the edge of said table being formed in such a manner that the table will receive the caps 38 coming from the races 6 in recesses 106, Fig. 11, corresponding to the shape of said caps. Along the edge of the table is provided a fixed guide bar 107 which secures the caps in their position on the table 105 so that the caps will be carried round with the table when the latter revolves in the direction indicated by the arrow, Fig. 11. Thereby the caps will be carried over and delivered to a sorting table 108, a vertical guide bar 109 being provided on the sorting table, the other end of which projects slightly over the edge of the table, 105 so that the bar 109 will serve to conduct the finished caps away from the table 105 and onto the sorting table 108. As the said cork discs are during their passage on the table 105 pressed tightly down into the caps while they are simultaneously being heated. This is obtained by a gas burner 110 being provided beneath the table 105 and by means of pressing arms 11 disposed all around along the upper side of the table, of which, however, only three are shown in Fig. 11. These pressing arms 111 are pivotally fitted to the standards 112 and are under action of suitable springs 113, which act against the inner end of the pressing arms and normally serve to press the downward ends 114 of these pressing arms downwards against the cork discs, as indicated in Fig. 10 at the right. For allowing of the caps being introduced into the table 5, and for not preventing them from leaving it and sliding over onto the sorting table 105, the pressing arms should be turned at the points mentioned. This is effected, as indicated in Fig. 10, on the right, by the inner end 115 of the pressing arms at that point sliding beneath a downward pointing stop 116 which is fitted to a standard 117 which extends upwards from the standard 104 through the revolving table 105.

The machine may be fitted with a counting device which is so arranged that it only counts the caps which have been completely finished in the machine, and is not operated by caps which have not been fitted with a paper disc, or adhesive or a cork disc.

The arrangement employed for operating the counting device is diagrammatically shown in Fig. 8.

To the shaft 85 serving to operate the cork slide 62 and the stamp 61 is fitted a crank disc 95 which, by means of a connecting rod 96 is coupled to a double armed lever 97 pivoted on a fixed pin 196, the said lever 97 partly operating the stamp 61 by a link 98, partly the counting device by a link 101. It is obvious that both the counting device and the stamp will be put out of action when the shaft 85 is disengaged by a cap being missing in the advanced row or rows of caps, and that the counting device consequently only will count the caps which have been fitted with cork discs.

Although in the accompanying drawings the machine is shown for dealing with only two rows of caps simultaneously, it is obvious that it just as well may be arranged for simultaneously dealing with several more rows fed parallel to each other.

The construction form shown in Figs. 1–8 can, furthermore, be modified and complemented in such a manner that it may be provided with a revolving pressing table for pressing down the paper and cork discs. This pressing table is constructed and fitted exactly as the pressing table shown in Figs. 10 and 11, operating with heat, but with the exception that the heating arrangement is omitted, as the bottle caps with paper lining need not be heated after the cork discs have been fitted, and need only have the cork discs as also the paper discs lying under them pressed down tightly into the cap.

The details of the construction described and shown may, of course, be varied and modified in many ways without departing from the principle of the invention.

I claim:

1. A machine for manufacturing bottle caps in the form of a metal cap with paper and cork discs fitted therein, comprising in combination, a feeding device constructed to feed the caps to the machine and intermittently advance them step by step in the longitudinal extension of the machine in two rows side by side, a paper disc fitting device disposed transversely across the path of the advancing rows of caps, means for operating said disc fitting device synchronously with the step by step feed of the caps, said disc fitting device being constructed to stamp the paper discs to be fitted into the caps from an intermittently advanced paper tape operatively related to the apparatus and to introduce them into the caps, a cork disc fitting device likewise disposed transversely across the advancing rows of caps, means for operating said cork disc fitting device synchronously with the intermittent feed of the caps, said cork disc fitting device being constructed to receive cork discs, supplied from a suitable container and simultaneously to introduce two cork discs into caps previously fitted with paper linings, devices common to both rows of caps constructed temporarily to suspend operation of the paper disc fitting device and the cork disc fitting device in the event that a cap should be missing in either or both of the step by step advanced rows of caps, in the place where one should be and which is about to assume operative position with respect to said device.

2. Machine as described in claim 1, characterized by a counting device which is connected to the cork disc fitting device so that it will record only when the cork disc fitting device is in operation.

3. Machine as described in claim 1 characterized in this that the cap feed races 6 are continued by an endless belt conveyor onto which the completed bottle caps made in the machine slide out so that the not fitted cap or caps which are defective can be sorted out.

4. Machine as described in claim 1, characterized in this that the cap feed races 6 are continued by a revolving pressing table, on which are provided positively geared pressing levers which serve to press the cork discs and paper discs tightly down into the caps, and from which table the finished caps slide over onto a sorting table where any caps that have not been fitted or defective caps may be sorted out.

5. Machine as described in claim 1 characterized in this that the device serving to feed the metal caps into the machine and to advance them intermittently in two or more rows beside each other, consists of a cap sorter 4 from which the caps slide down into two or more horizontal races 6 disposed longitudinally in the machine, in which races they are advanced intermittently by a feed wheel 7 and racklike bars 8 operated by means of crank pins 9 from the main shaft of the machine.

6. Machine as described in claim 1 characterized in this that the paper disc fitting device consists of a paper feed roller 29 from which the paper is conducted and a guide roller to a waste paper roll 12, a shaft from which said feed roller 28 and the waste paper roll 12 are intermittently revolved from the main shaft 2 of the machine by means of pawl gears 23, 25, and 24, 26, respectively, operated by said shaft 2, and a paper disc stamp 33 disposed above the advanced paper tape and vertically reciprocated from the main shaft, which stamp will at its downward stroke stamp the paper discs from the tape and introduce them into the metal caps lying below it.

7. Machine as described in claim 1, characterized in this that the cork disc fitting device consists of containers 54 fitted with agitators 57, into which the cork discs are filled and from which they fall down into holes 56 in revolving discs 55 in the bottom of said containers, beneath which discs there are other revolving discs 59 likewise having holes 58 which convey the cork discs out from the containers and through down races 60 in which the cork discs are stamped down by vertically reciprocated stamps 61 so that a cork slide 62 fitted at the lower end of said down races and horizontally reciprocated, will push them beneath a cork stamp 63 vertically reciprocated synchronously with the feed of the caps, which stamp 63 introduces the cork discs into the caps.

8. A machine as described in claim 1 having an adhesive applying device substituted for the paper disk fitting device, and operating synchronously with the intermittent feed of the caps.

9. A machine as described in claim 1 having an adhesive applying device substituted for the paper disk fitting device, operating synchronously with the intermittent feed of the caps, said adhesive applying device consisting of a vertically reciprocated container adapted to be filled with adhesive matter, and provided in the bottom thereof with the necessary number of outlets, valves closing said outlets and opening only when their valve spindles abut against the bottom of a cap, whereas the valves will remain closed if in the row of caps there be missing one or more of the caps, so that the valve spindle can move freely downward in a hole in the feed race which at the time is beneath the spindle.

In testimony whereof I affix my signature.

HENRY ARNOLD SKOV.